Dec. 10, 1968     R. E. WILLIAMS ET AL     3,415,448
RADIATION AND CONVECTION RESPONSIVE THERMO-ELECTRIC DETECTOR
Filed May 12, 1967     3 Sheets-Sheet 1

INVENTORS
R. E. WILLIAMS
H. C. NYE
BY
*Hugh A. Kirk*
ATTORNEY

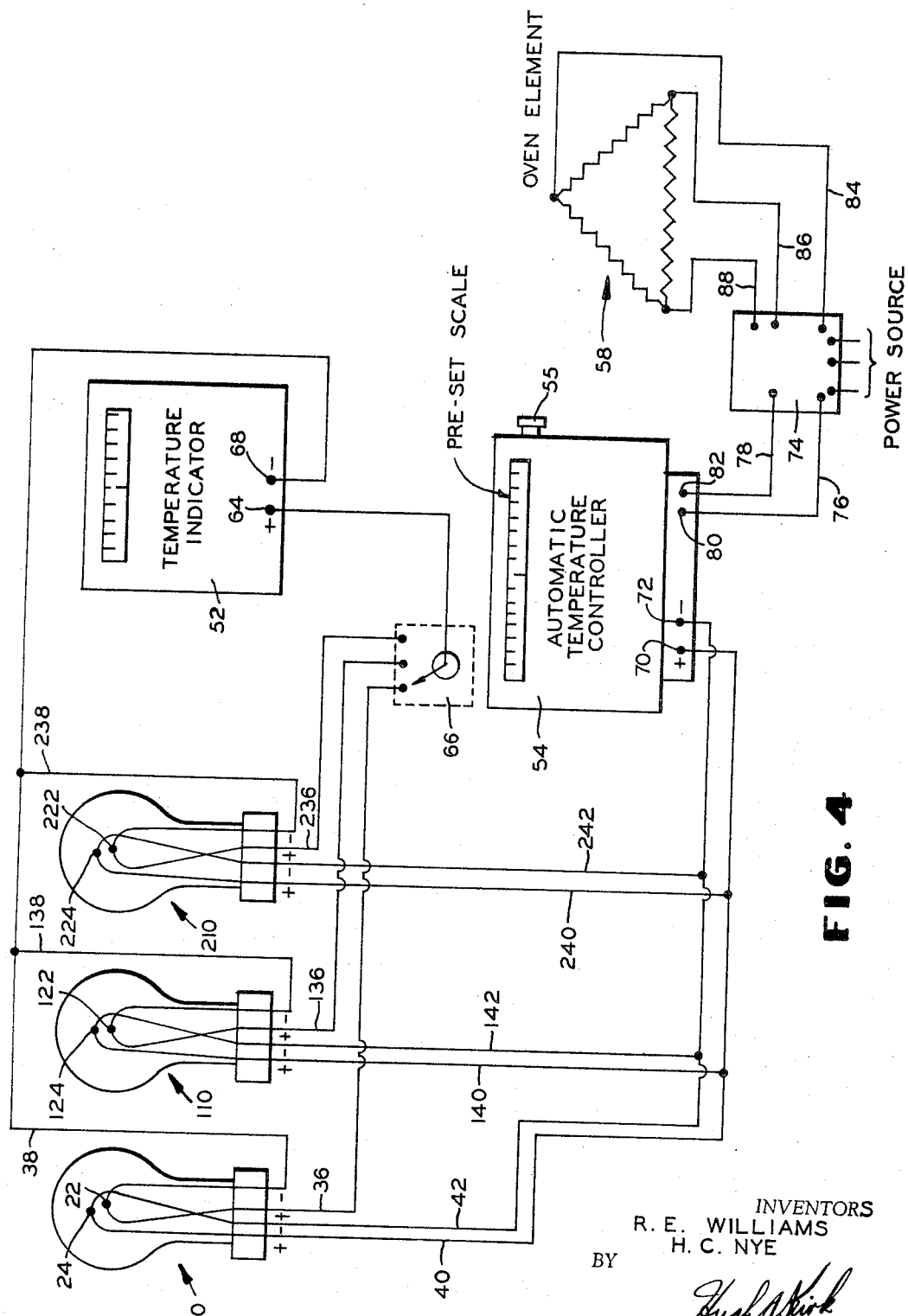

United States Patent Office 3,415,448
Patented Dec. 10, 1968

3,415,448
RADIATION AND CONVECTION RESPONSIVE THERMO-ELECTRIC DETECTOR
Ray E. Williams and Harold C. Nye, Fostoria, Ohio, assignors to Fostoria-Fannon, Incorporated, Fostoria, Ohio, a corporation of Ohio
Filed May 12, 1967, Ser. No. 638,038
10 Claims. (Cl. 236—15)

ABSTRACT OF THE DISCLOSURE

This is a heat sensing device for measuring and controlling radiant energy oven temperatures within prescribed ranges, having a protective envelope supported by an apertured base and containing a pair of independent thermocouples having flattened loops in parallel offset planes also supported by the same base. Each thermocouple is sensitive to both radiation and convection heat. Each thermocouple also has a fast response to heat radiating from the oven's source as well as its heated products, and a relatively slower response to convection heat within the oven so as to generate a balanced electromotive force which is proportional to the oven's temperature unaffected by spurious convection currents which may occur in the oven. One of the thermocouples of the pair is connected to a temperature indicating meter for checking the oven's temperature at a particular location or zone, while the other thermocouple of the pair is connected to an automatic temperature controller for controlling the degree of heat at that location or zone. A plurality of these sensing devices may be connected together for individually checking oven zone temperature and averaging these temperatures throughout a zone of an oven or furnace or the whole oven or furnace.

Background of the invention

Field involved

This invention relates to temperature measuring and controlling devices, having elements responsive to the relative intensity of heat radation rays, as well as to changes in flow of a fluid stream when subjected to relative heat changes. These elements are of the type which generate an electromotive force which is proportional to the temperature of the heat being measured.

Prior art

It is generally known that uniform non-fluctuating surface temperatures of articles moving through long continuous open end tunnel type radiant energy ovens are difficult to maintain, particularly since air flow is used in these ovens for exhaust of volatile materials and protective cooling of the oven. Furthermore, the intensity of the heat from radiation is much higher than the intensity of the heat from the convective currents induced by the air flow. Since the average length of such an oven is very great and air flow is induced therein, the temperature levels at different locations or zones throughout its length can substantially vary. The above described conditions are a constant source of trouble, particularly where extremely accurate temperature levels are required such as in those processes requiring a high power density for short periods of time.

An example of one such critical process is the baking of articles painted with a reflow type finish such as an acrylic resin. Reflow is commonly defined as heating the paint on an article to the point where the paint film becomes sufficiently plastic so that levelling of the paint coating occurs. In this instance the oven's temperature must be accurately controlled so that the reflow of the finished coating obliterates any scratches arising from a prior sanding stage without over-baking or under-baking the painted finish of an article.

Usually the temperature required for processing an article in actual production is determined and the oven temperature is then controlled on a regular time-power-density cycle. While this method is satisfactory for many applications it is unsatisfactory for high quality finishing applications, such as described above.

Attempts have been made to use simple small surface area thermocouple devices to effectively control temperature levels at zones throughout the whole radiant energy oven. These devices do not perform satisfactorily in that they are primarily sensitive to the convection heat and not primarily to radiation. Thus a simple thermocouple will not provide a proper balance between the convection and radiation heats to maintain either zones of the oven or the whole oven's temperature at a uniform level.

The above difficulty may be overcome by coupling thermocouples to a relatively large area radiation absorbing target. This target is located in close proximity to the radiating surface whose temperature is to be measured, and although it is sensitive to radiation, because of its relatively large area and mass, its response to temperature change is very slow. Moreover, the target's large area is subjected to the varying air flow within the oven, which also affects its temperature response and causes its thermocouple's output to fluctuate.

Further, conventional radiometers have been used for controlling temperatures within an oven, however they sense the product's surface temperatures so quickly that when they are used with a feed-back closed loop controller, their response to temperature change is too fast and hunting occurs. Furthermore, these radiometers may give false readings because of the reflections of the heat source from the product itself. Also, these radiometers are not sensitive to the moving atmosphere surrounding the articles.

Thus, the prior art devices are deficient in that they do not have the proper sensitivity to both radiation and convection heat for balancing the temperature of a radiant oven which has air flow designed therein.

Summary of the invention

The sensing means of this invention comprises a heat radiation permeable shield, bulb or envelope formed of lime glass or like material, which has an internal convection heating rate comparable to the external or oven's convection heating rate. A base portion of this envelope supports a pair of light weight, large area, adjacently spaced, parallel, and offset, similarly flattened and blackened radiation sensitive independent thermocouple hot junctions within the gas containing envelope. This base portion is also provided with an aperture so that the gas inside the envelope is in communication with the atmosphere so that undesirable pressures will not build up inside of the envelope. However, the size of this aperture is not so great as to materially effect any convection currents which may be set up inside the envelope. This envelope and its thermocouples may be mounted on an articulated arm for directionally positioning the flattened thermocouples in a radiantly heated oven. Means is provided for controlling the radiant heating elements in an oven, which means is controlled by one of the thermocouples in the envelope, while the other thermocouple in the envelope is used to check the oven's temperature at that envelope's location.

A plurality of sensing means of the present invention can maintain an average uniform temperature throughout a long oven of similar zones by interconnecting their temperature controlling thermocouples. The separate thermocouple in each sensing means is used to (a) check the temperature in any preselected zone of the oven, (b) check that the radiation heat input controller is not averaging wide ranges of temperatures throughout the oven, and/or (c) check that the heat in all zones is uniform.

Accordingly an object of this invention is to provide a fast acting and continuous shielded or enclosed sensing means that is sensitive to convection heat as well as radiation heat.

Another object is to provide such a sensing means which has an internal convection heating rate which is comparable to the external convection heating rate within the oven in which it is used.

Still another object is to provide such a sensing means which has a fast response to radiation heat and a relatively slower response to convection heat for providing a proper balance therebetween to control the temperature within an oven and which has little or no tendency to overshoot or undershoot a set temperature point.

Yet another object is to provide such a sensing means which will individually indicate the temperature at a location so that optimum operating conditions of heating elements can be maintained.

A further object is to provide a shielded sensing means which has light weight, large area hot junction thermocouples that have good radiation absorbing capabilities, is simple in construction, efficient in operation, is readily and easily adjustable as to its position in an oven, and is inexpensive to manufacture.

*Brief description of the drawings*

The above mentioned and other features, objects, and advantages and the manner of attaining them are described more specifically below by reference to an embodiment of this invention shown in the accompanying drawings, wherein:

FIG. 4 is a schematic wiring diagram showing one embodiment of an electrical control circuit for the sensing means of this invention in an oven similar to that shown in FIG. 3.

*Detailed description*

*The sensing means*

Figure 1:
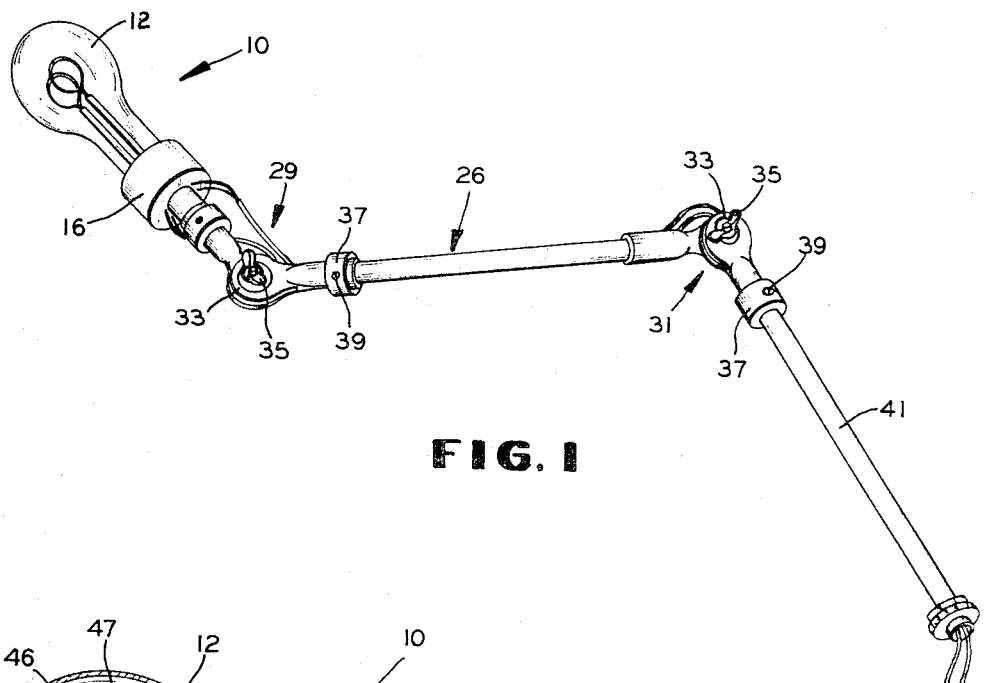
FIG. 1 is a perspective view of one embodiment of a sensing means of this invention mounted on an articulated arm.
Figure 2:
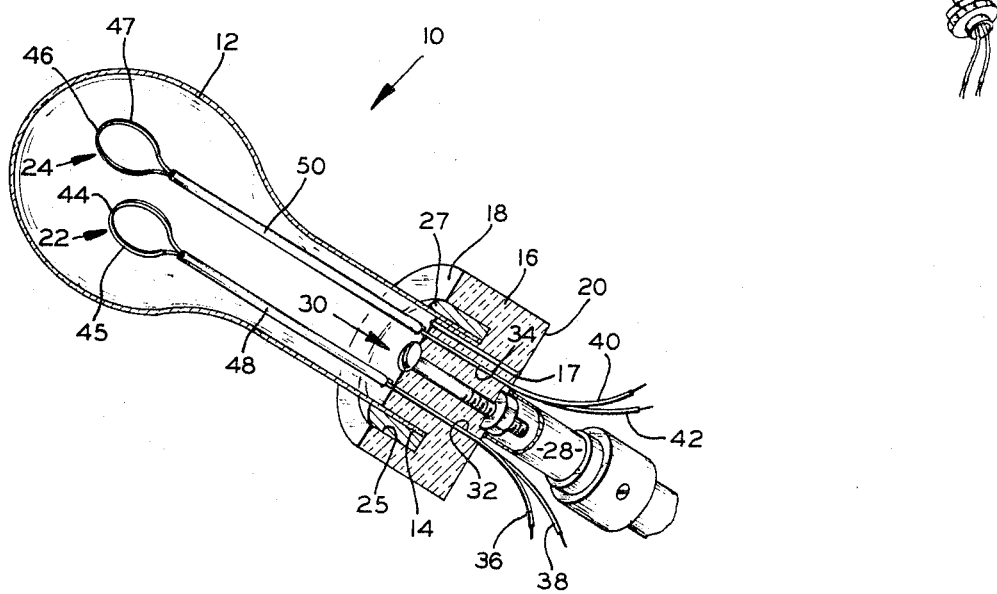
FIG. 2 is an enlarged perspective view, partly in section, showing the construction of the sensing means.

As shown in the drawings, particularly FIGS. 1 and 2, a sensing means 10 generally comprises an envelope or bulb 12 having a base 16 and a pair of thermocouples 22 and 24 supported by the base and projecting inside the envelope. The envelope 12 comprises a radiation permeable, heat transmitting, pear-shaped bulb such as lime glass, Pyrex, quartz, or like material having an annular open end 14. The cap or base portion 16 may be a heat resistant opaque solid cylinder having a pair of parallel circular faces or ends 18 and 20, one face 18 of which is adapted to receive and seal the annular open end 14 of the envelope 12. This base 16 is provided with an opening or port 17 so that the interior of the envelope 12 may communicate with the surrounding atmosphere. Thus, gas particles are present in the envelope for convection purposes, and detrimental gas pressure cannot build up therein. The pair of parallel thermocouples 22 and 24 in the envelope are relatively spaced, offset, and independently supported by the base 16 and each projects from the face 18 into the central portion of the bulb 12.

The open end 14 of the envelope 12 may be received in an annular groove 25 disposed in the face 18 of the base 16 and is sealingly secured thereto by means of a heat resistant cement 27. This seal prevents air currents from outside the envelope 12 directly affecting the thermocouples 22 and 24, and insures that only the convection currents of the gas or air in the bulb will transmit convection heat to these thermocouples.

The sensing means 10 may be adjustably mounted on a hollow articulated arm 26 by means of an elongated rod 28 which rod may be threadedly secured to a centrally disposed stud bolt arrangement 30 projecting from the face 20 of the base portion 16. This articulate arm 26 may be provided with a pair of universal joints 29 and 31 so that the flat sides of the thermocouples can be directed to effectively absorb the radiation in an oven 56 to give the desired temperature reading. These joints 29 and 31 may each comprise a pair of disks 33 clamped by a wing nut 35, and a rotatable sleeve 37 clamped by a set-screw 39 to a tubular portion 41 of the arm 26. Once positioned, the arm may be permanently fixed in place by tightening of the nuts 35 and screw 39.

The pair of thermocouples 22 and 24 each projects from the face 18 of the base 16 through longitudinally extending openings 32 and 34 which may be for each wire of each thermocouple, and which wires are supportingly cemented therein. These thermocouples 22 and 24 each have a pair of wire elements 36, 38, and 40, 42, respectively, of which one element 36 and 40 of each may be formed from a copper-nickel alloy, such as "constantan," while the other element 38 and 42 of each may be formed of iron. The elements 36 and 38 are joined together, such as by welding, and are located in the envelope 12 to form a hot junction 44 of the thermocouple 22, and the elements 40 and 42 are also similarly joined together and located in the envelope 12 to form a hot junction 46 of the thermocouple 24. A light weight, large area hot junction for absorbing radiation heat effectively is provided by flattening each of the wire elements 36, 38 and 40, 42, at their junctions 44 and 46, respectively, in the form of annular loops 45 and 47, respectively. These loops 45 and 47 are blackened by some suitable means for increasing their radiation heat absorption capacity as well as protecting them from oxidation, and are located with their flat surfaces parallel and off-set with respect to each other so as to receive substantially the same radiation normal to their surfaces without shielding one another. The wires 36, 38 and 40, 42 from the hot junction loops 45 and 47 are encased in insulating jackets 48 and 50 respectively, to the base 16 to further support these loops. On the outside of the base 16, these wires 36, 38, 40 and 42 also are insulated and may pass through the hollow articulated sections 41 of arm 26 and thence on for connection to terminals of the remote temperature indicating and controlling instruments 52 and 54 (see FIG. 4), respectively, which are described in more detail hereinafter. The cold junctions of the iron and constantan elements of the thermocouples 22 and 24, respectively, are at these terminals of the indicating and recording instruments 52 and 54, respectively, so that they are subjected to relatively constant ambient temperatures considerably lower than those in the oven.

*Operation of the sensing means*

In a typical installation a sensing means 10 is adjustably positioned so that the flat sides of the hot junctions 45 and 47 can be directed to absorb radiation from a desired direction. The thermocouples 22 and 24 then are heated by radiation, including radiation emitting from heated articles in the oven, and these thermocouples usually reach a level-off temperature in less than a minute. The envelope 12 is also heated by both conduction and convection in the oven, and this heat is transferred to the gas inside the envelope 12, which heat is then transferred to the thermocouples 22 and 24 by convection of the gas inside the envelope. This slower convection heating rate inside the envelope 12 is comparable to the convection effect inside an oven itself and thus, the thermocouples 22 and 24 are not rapidly affected by short gusts of cooler or hotter air that often occur in such ovens.

Since these thermocouples 22 and 24 have a fast response to the radiation emitted inside the oven and a relatively slower response to the convection heat within the envelope 12, the sensing means 10 thereby provides a proper balance between these heats to control the temperature quicker and more accurately and uniformly than has been possible heretofore.

The oven and its control circuits

Figure 3:
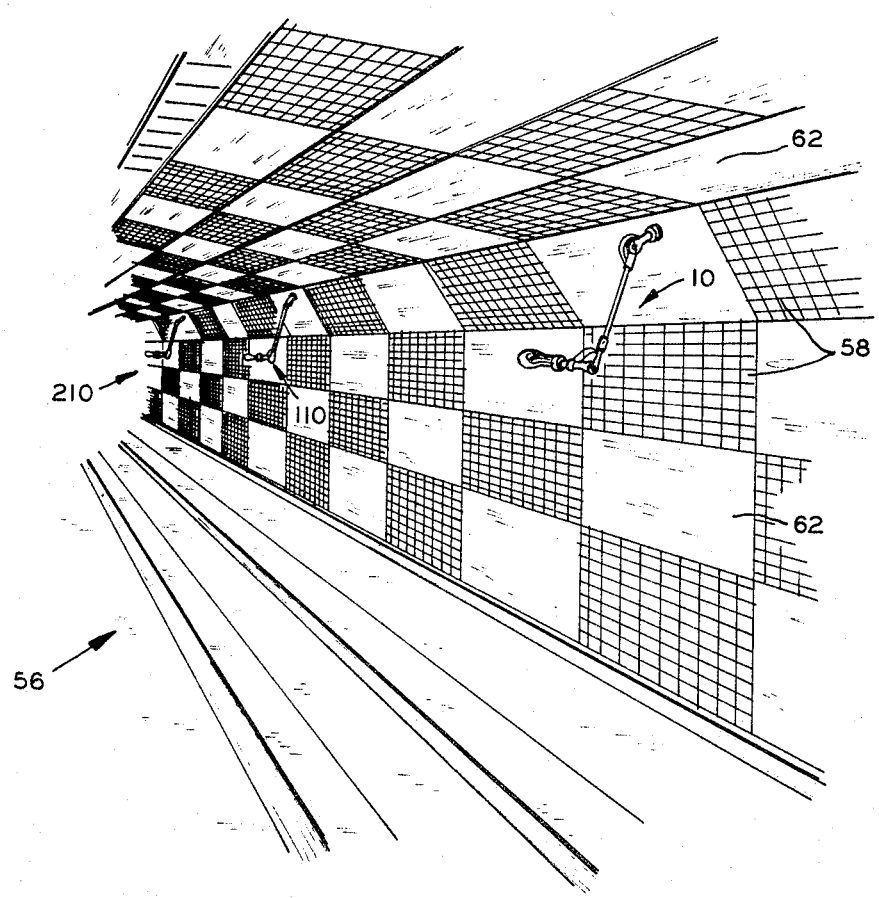
FIG. 3 is a perspective view of an infra-red tunnel type oven showing a plurality of sensing means of this invention at spaced locations along the length thereof.

Referring now to FIGS. 3 and 4, particularly FIG. 3, there is shown a portion of a long infra-red tunnel oven 56, open at both of its ends, which is built from standardized modular components or sections. These sections, in this instance, may comprise alternately spaced heating elements 58, an electrical circuit therefor (shown schematically in FIG. 4), and a plurality of alternately spaced reflectors 62. In other oven installations these sections may only comprise heating elements such as the heating elements 58. Spaced at intervals along the length of one zone or the whole oven 56, are a plurality of sensing means 10, 110 and 210, at selected locations where temperatures are to be averaged and checked, such as for example, each fifteen feet in a hundred foot zone or oven. As previously noted the heat levels in various parts of the oven 56 can differ quite extensively, thus, a plurality of sensing means are required to effectively control the temperature at an average uniform level throughout any zone of or the whole oven 56.

An electrical circuit for controlling and measuring the temperature levels at the various locations throughout the oven 56 is illustrated in FIG. 4. This circuit shows three sensing means 10, 110 and 210, however, this is only representative, as any number of sensing means can be used depending on the length or size of the zone or oven 56 and the uniformity of heat required in each zone.

In this circuit the leads 40–42, 140–142, and 240–242 of the thermocouples 24, 124 and 224 of each sensing means 10, 110 and 210 may be connected in parallel to the terminals 70–72, respectively, of the automatic temperature controller 54 which may be pre-set at a desired temperature level by a manual knob means 55 to maintain an average temperature throughout a zone or the whole oven 56. A proportionating power control device 74 is connected via leads 76 and 78 to terminals 80 and 82 respectively of the automatic temperature controller 54 and is operated thereby to either energize, de-energize or proportionally energize the oven heating elements 58. If these elements 58 are electrically heated, the proportional controller 74 may be connected in a delta arrangement from a source of power (not shown) via leads 84, 86 and 88, while if the elements are gas heated, this controller 74 may operate fuel-air mixture and volume control means therefor.

The other thermocouples 22, 122, and 222 of each sensing means 10, 110 and 210 may be separately connectable through leads 36, 136 and 236 to a manually operable selector switch 66 to the temperature indicator 52. The other leads 38, 138 and 238 of these thermocouples 10, 110 and 210 are directly connected to a terminal 68 of this indicator 52. Thus, the temperature at each location can be selectively ascertained for checking if the heaters and/or blowers in that section of the oven are producing a temperature within the range of that produced in the other sections of the zone or oven connected to this circuit.

If different zones in one oven are to have different temperatures, separate controller circuits as shown in FIG. 4 are provided for each such zone.

The sensing device of this invention may be used for controlling temperatures in radiant ovens or furnaces, for example, from about room temperature up to about 1700° F.

While there is described above the principle of this invention in connection with specific apparatus, it is to be understood that this description is made only by way of example and not as a limitation to the scope of the invention.

What is claimed is:

1. In an oven heated by radiating heaters for heating products which are moved therein, which oven may contain spurious air currents, the improvement in a radiation and convection temperature sensing means (10) unaffected by such spurious air currents, comprising:
   (A) a gas containing radiation permeable envelope having a base portion (16) with an aperture (17) of such a size therethrough so that said spurious air currents will not materially affect said gas therein,
   (B) a pair of light weight large area spaced independent thermocouples (22, 24) supported by said base and projecting into said envelope (12),
       (a) said gas providing convection current in said envelope (12) for heating said thermocouples (22, 24),
       (b) said thermocouples (22, 24) each having exposed flattened and blackened loop shaped (45, 47) hot junctions (44, 46) in the central portion of said envelope (12) responsive to radiation also for heating said thermocouples (22, 24);
   whereby said thermocouples (22, 24) have a relatively fast response to radiation and a slower response to convection heat.

2. A sensing means according to claim 1 wherein said hot junctions have their flattened surfaces parallel to each other.

3. A sensing means according to claim 1 including an oven (56) and an articulated arm (26) secured for supporting said sensing means in said oven.

4. A sensing means according to claim 3 wherein said articulated arm includes at least one universal joint (29, 31) for directionally positioning said sensing means in said oven.

5. A sensing means according to claim 1 including a temperature indicating instrument (52) connected to one of said thermocouples (22).

6. A sensing means according to claim 1 including an automatic temperature controller (54) connected to one of said thermocouples (24).

7. A sensing means according to claim 1 including an oven (56) and separate electric devices (52, 54) responsive to each said thermocouple (22, 24), said electric devices being located outside of said oven.

8. A sensing means according to claim 7 wherein each of said thermocouples (22, 24) is formed of wires (36, 38, 40, 42) of dissimilar material which extend through said envelope and which are connected to said devices, said connections at said devices being the cold junctions of said thermocouples (22, 24).

9. A sensing means according to claim 1 wherein said exposed flattened radiation absorbing loops (45, 47) are parallel and offset with respect to each other.

10. A sensing means according to claim 1 wherein said envelope and said thermocouples are attached to said base by a heat resistant cement (27).

References Cited

UNITED STATES PATENTS

| | | | |
|---|---|---|---|
| 3,077,775 | 2/1963 | Hoffman | 73—341 |
| 3,163,406 | 12/1964 | Stelling et al. | 236—15 X |
| 3,255,632 | 6/1966 | Brooks | 73—355 |
| 3,282,107 | 11/1966 | Ekstrom | 73—355 |
| 3,286,524 | 11/1966 | Malone | 73—355 X |
| 3,321,974 | 5/1967 | Sterbutzel | 73—359 |

ROBERT A. O'LEARY, *Primary Examiner.*

W. E. WAYNER, *Assistant Examiner.*

U.S. Cl. X.R.

236—078; 73—341, 359; 219—354